(12) United States Patent
Kadowaki et al.

(10) Patent No.: US 7,816,432 B2
(45) Date of Patent: *Oct. 19, 2010

(54) CURABLE COMPOSITION, CURED PRODUCT THEREOF, MOLDED PRODUCT THEREOF AND USE AS FUEL CELL SEPARATOR

(75) Inventors: Etsuko Kadowaki, Oita (JP); Tadashi Iino, Kawasaki (JP); Hiroshi Uchida, Kawasaki (JP); Terutoshi Kumaki, Kawasaki (JP); Kentaro Seki, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 10/540,028

(22) PCT Filed: Dec. 24, 2003

(86) PCT No.: PCT/JP03/16626

§ 371 (c)(1),
(2), (4) Date: Jun. 22, 2005

(87) PCT Pub. No.: WO2004/059766

PCT Pub. Date: Jul. 15, 2004

(65) Prior Publication Data

US 2006/0116466 A1    Jun. 1, 2006

Related U.S. Application Data

(60) Provisional application No. 60/437,317, filed on Jan. 2, 2003.

(30) Foreign Application Priority Data

Dec. 24, 2002    (JP) ............... 2002-372853
Jun. 18, 2003    (JP) ............... 2003-173155

(51) Int. Cl.
  *C08K 5/15*    (2006.01)
(52) U.S. Cl. ............... 524/114; 524/190; 524/571; 429/34

(58) Field of Classification Search ............... 429/34; 524/575, 571, 114, 190
See application file for complete search history.

(56) References Cited

U.S. PATENT DOCUMENTS

| | | | | |
|---|---|---|---|---|
| 3,937,681 A | * | 2/1976 | Nordsiek | 524/571 |
| 5,304,326 A | * | 4/1994 | Goto et al. | 252/511 |
| 5,895,798 A | * | 4/1999 | Okamoto et al. | 524/571 |
| 6,335,118 B1 | * | 1/2002 | Sung et al. | 429/213 |
| 6,403,727 B1 | | 6/2002 | Leube et al. | |
| 6,436,567 B1 | * | 8/2002 | Saito et al. | 429/34 |
| 6,586,533 B1 | * | 7/2003 | Landi et al. | 525/315 |
| 6,833,219 B2 | | 12/2004 | Lee et al. | |
| 7,202,295 B2 | * | 4/2007 | Simonot et al. | 524/443 |
| 2002/0086198 A1 | | 7/2002 | Iino et al. | |

FOREIGN PATENT DOCUMENTS

| | | |
|---|---|---|
| CN | 1280587 A | 1/2001 |
| JP | 58-53167 A | 3/1983 |
| JP | 5-194927 A | 8/1993 |
| JP | 7-216159 A | 8/1995 |
| JP | 8-222241 A | 8/1996 |
| JP | 11-154521 A | 6/1999 |
| JP | 2000-313807 A | 11/2000 |
| JP | 2001-68128 A | 3/2001 |
| JP | 2001-151833 A | 6/2001 |
| JP | 2002-88208 A | 3/2002 |
| JP | 2002-216803 A | 8/2002 |
| JP | 2002-363427 A | 12/2002 |
| JP | 2003-105098 A | 4/2003 |
| JP | 3937962 B2 | 6/2003 |
| JP | 2003-217605 A | 7/2003 |
| JP | 2004-99675 A | 4/2004 |
| WO | WO 99/67794 A | 12/1999 |
| WO | WO 01/95344 A1 | 12/2001 |

* cited by examiner

*Primary Examiner*—Peter D Mulcahy
(74) *Attorney, Agent, or Firm*—Sughrue Mion, PLLC (57) ABSTRACT

A curable composition comprising: (A) a hydrocarbon compound having a plurality of carbon-carbon double bonds, and (B) a carbonaceous material. The hydrocarbon compound may preferably be 1,2-polybutadiene. The curable composition may be used for a fuel cell separator.

10 Claims, 3 Drawing Sheets

FRONT SURFACE

BACK SURFACE

Fig.3

CURABLE COMPOSITION, CURED PRODUCT THEREOF, MOLDED PRODUCT THEREOF AND USE AS FUEL CELL SEPARATOR

This Application claims the priority of an application based on U.S. Provisional Application Ser. No. 60/437,317 (filed on Jan. 2, 2003).

TECHNICAL FIELD

The present invention relates to a curable composition and, particularly, to a curable resin composition suitably usable for a separator for fuel cells. More specifically, the present invention relates to a curable composition capable of providing a cured product having hydrothermal (or hot water) resistance, which is excellent in hydrothermal resistance, electroconductivity, and moldability, and also relates to a cured product to be obtained from such a curable composition, a molded (or shaped) product thereof, a fuel cell separator, and a process for producing the fuel cell separator.

BACKGROUND ART

Heretofore, certain materials such as metals and carbon materials have been used in fields wherein high electroconductivity is required. Among these, carbon materials are free from corrosion unlike metals, and are excellent in electroconductivity, thermal resistance, lubricity, heat conductivity, durability, etc. Therefore, carbon materials have played an important role in various fields such as electronics, electrochemistry, energy and transportation equipment, etc. Also, composite materials based on a combination of a carbon material and a polymer material have made remarkable progress and permit high performance and high function in various materials. Particularly, the degree of freedom of mold workability is expanded due to a combination of a carbon material and a polymer material, and this is one reason why carbon materials have been developed in fields where electroconductivity is required.

Examples of the usage or application for the carbon material in which the electroconductivity is required, may include: electronic materials such as circuit boards, resistors, laminates, and electrodes; and various members such as heaters, members constituting heat-generating devices, and dust-collecting filter elements. In these applications, high thermal resistance is required together with an electroconductivity.

On the other hand, in view of environmental problems and energy problems, fuel cells have attracted much attention as clean power-generating devices, because they generate electric power by a reverse reaction of electrolysis using hydrogen and oxygen, and they produce no exhaust material other than water. Also, in this field, carbon materials and polymer materials have important roles.

The fuel cells can be classified into several kinds, depending on the kind of the electrolyte to be used therefor. Among such fuel cells, solid polymer electrolyte-type fuel cells can work at a low temperature, and therefore they are most useful for automobile or public or civilian uses. This type of fuel cell is constructed by stacking unit cells, each of which comprises, e.g., a polymer electrolyte, a gas diffusion electrode, a catalyst and a separator, and the fuel cell can attain high-output power generation.

In the fuel cell having the above structure, the separator is always in contact with water which is produced by the reaction for electric power generation. It is said that the operating (or working) temperature of the above solid-type fuel cell is about 80° C. However, in applications of the fuel cell wherein a long operating time is expected, the separator is required to have a thermal resistance (particularly, hydrothermal resistance) which can bear the use thereof for a long period.

In addition, the separator to used for such a purpose to partition the unit cells usually has at least one flow channel (or groove) to which a fuel gas (hydrogen) and an oxidant gas (oxygen) are supplied, and from which the produced water content (steam) is discharged. Therefore, the separator is required to have a high gas impermeability capable of perfectly separating these gases, and is also required to have a high electroconductivity to reduce the internal resistance. Further, the separator is required to be excellent in heat conductivity, durability, strength, etc.

To satisfy these requirements, the separator has been heretofore studied in view of both aspects of metal and carbon materials. Metals have a problem in the corrosion resistance thereof and therefore, an attempt has been made to cover the surface thereof with a noble metal or carbon. However, in such a case, a sufficiently high durability cannot be obtained and moreover, the cost for covering the metal is problematic.

On the other hand, a large number of carbon materials have been studied as carbon materials for fuel cell separators, and examples thereof include a molded article obtained by press-molding an expanded graphite sheet, a molded article obtained by impregnating a carbon sintered body with a resin and curing (or hardening) the resin, a vitreous carbon obtained by baking a thermosetting resin, and a molded article obtained by mixing a carbon powder and a resin and molding the resultant mixture.

For example, JP-A-8-222241 (Patent Document 1; the term "JP-A" as used herein means an "unexamined published Japanese patent application") discloses a complicated process such that a binder is added to a carbon powder and mixed under heating, the mixture is CIP (Cold Isostatic Pressing)-molded, baked and graphitized, and the thus obtained isotropic graphite material is impregnated with a thermosetting resin and subjected to a curing treatment, and grooves are engraved therein by cutting.

JP-A-60-161144 (Patent Document 2) discloses a technique of impregnating a paper containing carbon powder or carbon fiber with a thermosetting resin, stacking and press-bonding the resultant papers, and baking the stacked body. JP-A-2001-68128 (Patent Document 3) discloses a technique of injection-molding a phenol resin into a separator-shaped mold and baking the molded resin.

The materials which have been subjected to a baking treatment as in these examples can exhibit a high electroconductivity and a high thermal resistance, but the baking takes a long time and the productivity is low, and these materials also have a problem that they have a poor bending (or flexural) strength. Further, when cutting these materials is necessary, the mass productivity is low and the cost is high and, therefore, these materials can hardly become popular in the future.

A molding method is considered as means being expected to bring high mass productivity and low cost. The material applicable thereto is generally a composite of a carbonaceous material and a resin. For example, JP-A-58-53167 (Patent Document 4), JP-A-60-37670 (Patent Document 5), JP-A-60-246568 (Patent Document 6), JP-B-64-340 (Patent Document 7; the term "JP-B" as used herein means an "examined Japanese patent application") and JP-B-6-22136 (Patent Document 8) disclose a separator comprising graphite, carbon and a thermosetting resin such as phenol resin. JP-B-57-42157 (Patent Document 9) discloses a bipolar separator comprising a thermosetting resin such as epoxy resin, and an electroconductive substance such as graphite, and JP-A-1-

311570 (Patent Document 10) discloses a separator obtained by blending an expanded graphite and a carbon black with a thermosetting resin such as phenol resin and furan resin. In addition, JP-A 11-154521 (Patent Document 11) disclose a separator capable of preventing the deterioration in the use thereof at a high temperature by using the brominated epoxy resin as a fire retardant.

[Patent Document 1] JP-A 08-222241
[Patent Document 2] JP-A 60-161144
[Patent Document 3] JP-A 2001-068128
[Patent Document 4] JP-A 58-053167
[Patent Document 5] JP-A 60-037670
[Patent Document 6] JP-A 60-246568
[Patent Document 7] JP-B 64-000340
[Patent Document 8] JP-B 06-022136
[Patent Document 9] JP-B 57-042157
[Patent Document 10] JP-A 01-311570
[Patent Document 11] JP-A 11-154521

The above-mentioned conventional various kinds of cured products comprising thermosetting resins and carbonaceous materials do not have sufficient performances, in view of a high thermal resistance which is required in many applications such as electrodes, heaters, heat-generating device members, and fuel cell separators.

In addition, and particularly in the case of a fuel cell separator, it is required to have a hydrothermal resistance, in addition to a thermal resistance. However, the above-mentioned conventional cured products comprising thermosetting resins and carbonaceous materials do not have sufficient performances, in view of a high hydrothermal resistance which is required for the use of fuel cell separators. In other words, the thermosetting resin having an ester bond or urethane bond in the structure thereof can be hydrolyzed in some cases by hot water produced from the fuel cell. Accordingly, when the conventional cured product comprising a thermosetting resin and a carbonaceous materials is used in the case of automobiles and household electric appliances which are expected to be used for a long time, it is impossible to obtain a product having a sufficient durability.

DISCLOSURE OF INVENTION

An object of the present invention is to provide a curable composition which solves the above-mentioned problems encountered in the prior art.

Another object of the present invention is to provide a curable composition capable of providing a cured product having a high electroconductivity, which is excellent in thermal resistance, hydrothermal resistance, electroconductivity, and moldability (such as those in compression molding, transfer molding, injection molding, and injection compression molding).

A further object of the present invention is to provide a low-cost cured product to be obtained by molding the above curable composition, which is excellent in thermal resistance, hydrothermal resistance, electroconductivity, and heat-radiating property; a molded product thereof, a fuel cell separator, and a process for producing the fuel cell separator.

As a result of earnest study, the present inventors have found that a hydrocarbon compound having a plurality of carbon-carbon double bonds (particularly a 1,2-polymer product of a diene compound) in combination with a carbonaceous material, provides a cured product not only excellent in moldability, but also excellent in hydrothermal resistance and electroconductivity. The present invention has been accomplished based on such a discovery.

For example, the present invention may include the following embodiments [1]-[25].

(1) A curable composition comprising:
(A) a hydrocarbon compound having a plurality of carbon-carbon double bonds, and
(B) a carbonaceous material.

(2) A curable composition according to (1) wherein the hydrocarbon compound (A) having a plurality of carbon-carbon double bonds is a polymer having a carbon-carbon double bond in the side chain thereof.

(3) A curable composition according to (2) wherein the polymer having a carbon-carbon double bond has a carbon-carbon double bond in the side chain thereof, and has a main chain containing 60 mole % or more of saturated monomer units.

(4) A curable composition according to (3) wherein the polymer having a carbon-carbon double bond in the side chain thereof, and having a main chain containing 60 mole % or more of saturated monomer units, is a polymer which has been obtained by polymerizing a diene compound as a main monomer.

(5) A curable composition according to (4) wherein the diene compound is at least one kind selected from the group consisting of: butadiene, pentadiene and isoprene.

(6) A curable composition according to (1) wherein the hydrocarbon compound (A) having a plurality of carbon-carbon double bonds is at least one kind selected from the group consisting of: 1,2-polybutadiene and 3,4-polyisoprene.

(7) A curable composition according to (1) wherein the hydrocarbon compound (A) having a plurality of carbon-carbon double bonds is a polymer containing 60 mole % or more of a monomer unit represented by the following formula (1) or (2):

(8) A curable composition according to (1) wherein the hydrocarbon compound (A) having a plurality of carbon-carbon double bonds is at least one kind selected from the group consisting of the compounds which have been obtained by hydrogenating a portion of the carbon-carbon double bonds in the side chain of 1,2-polybutadiene and 3,4-polyisoprene.

(9) A curable composition according to (1) wherein the hydrocarbon compound (A) having a plurality of carbon-carbon double bonds is a blend comprising:
at least one kind selected from the group consisting of the compounds which have been obtained by hydrogenating a portion of the carbon-carbon double bonds in the side chain of 1,2-polybutadiene and/or 3,4-polyisoprene; and
at least one kind selected from the group consisting of 1,2-polybutadiene and/or 3,4-polyisoprene.

(10) A curable composition according to (1) wherein the hydrocarbon compound (A) having a plurality of carbon-carbon double bonds comprises:
5 to 80 mass % of at least one kind selected from the group consisting of the compounds which have been obtained by hydrogenating a portion of the carbon-carbon double bonds in the side chain of 1,2-polybutadiene and/or 3,4-polyisoprene; and 20 to 95 mass % of at least one kind selected from the group consisting of 1,2-polybutadiene and/or 3,4-polyisoprene.

(11) A curable composition according to (1) wherein the carbonaceous material (B) is selected from the group consisting of, or a combination of at least two kinds of: natural graphite, artificial graphite, expanded graphite, carbon black, carbon fiber, vapor-phase grown carbon fiber, and carbon nanotube.

(12) A curable composition according to (1) wherein the carbonaceous material (B) has a powder electric resistivity in the right angle direction is 0.1 Ωcm or less with respect to the applied pressure direction in a state where the carbonaceous material is pressed so as to provide a bulk density of the g carbonaceous material of 1 g/cm$^3$.

(13) A curable composition according to (1) wherein the carbonaceous material (B) contains 0.05 mass % to 10 mass % of boron.

(14) A curable composition according to (1) which further contains a reactive monomer (C).

(15) A hydrothermally resistant electroconductive cured product which has been obtained by curing the curable composition according to any of (1)-(14).

(16) A hydrothermally resistant electroconductive cured product according to (15) which has a Tg of 160° C. or more, and a bending strength of 30 MPa or more in accordance with JIS K 6911.

(17) A hydrothermally resistant electroconductive cured product according to (15) or (16) which has a rate of mass change in the range of +1.5% to −1.5%, when a test piece of the cured product having a size of 30 mm×30 mm×3 mm is subjected to a hydrothermal resistance test at 180° C., for 168 hours.

(18) A hydrothermally resistant molded product which has been obtained by curing the curable composition according to any of (1)-(14);
wherein at least one flow channel for a gas is formed on one side or both sides thereof.

(19) A fuel cell separator which has been obtained by curing and molding the curable composition according to any of (1)-(14);
wherein at least one flow channel for a gas is formed on one side or both sides thereof.

(20) A fuel cell separator, which has a Tg of 160° C. or more, and a bending strength of 30 MPa or more in accordance with JIS K 6911; and
has a rate of mass change in the range of +1.5% to −1.5%, when a test piece of the fuel cell separator having a size of 30 mm×30 mm×3 mm is subjected to a hydrothermal resistance test at 180° C., for 168 hours.

(21) A process for producing the hydrothermally resistant molded product according to (18) wherein the molded product is produced by any of compression molding, transfer molding, injection molding or injection compression molding.

(22) A process for producing the fuel cell separator according to (19) wherein the fuel cell separator is produced by any of compression molding, transfer molding, injection molding or injection compression molding.

(23) A curable composition for the fuel cell separator, which comprises the curable composition according to any of (1)-(14).

(24) A partially hydrogenated 1,2-polybutadien, which has been obtained by hydrogenating 3-90 mole % of the carbon-carbon double bonds of the side chain of 1,2-polybutadiene.

(25) A partially hydrogenated 3,4-polyisoprene, which has been obtained by hydrogenating 3-90 mole % of the carbon-carbon double bonds of the side chain of 3,4-polyisoprene.

BRIEF DESCRIPTION OF DRAWINGS

In these figures, the respective Reference Numerals have the following meanings:
1: electrode comprising copper plate
2: compression rod comprising resin
3: pedestal (made of resin)
4: side frame (made of resin)
5: sample (carbonaceous material powder)
6: voltage probe

BEST MODE FOR CARRYING OUT THE INVENTION

Hereinbelow, the present invention will be described in detail with reference to the accompanying drawings as desired. In the following description, "%" and "part(s)" representing a quantitative proportion or ratio are those based on mass, unless otherwise specifically noted.

(Curable Composition)

The curable composition according to the present invention comprises, at least, (A) a hydrocarbon compound having a plurality of carbon-carbon double bonds, and (B) a carbonaceous material.

(Hydrocarbon Having a Plurality of Double Bonds)

The hydrocarbon compound, having a plurality of the carbon-carbon double bonds, as a component (A) in the present invention is a compound basically comprising carbon atoms and hydrogen atoms, but it may also comprise oxygen atoms, and/or nitrogen atoms. However, the compound (A) may preferably have a structure including an ester bond, a urethane bond, and an amide bond, if any, in as small portion as possible, in view of the prevention of the hydrolysis by hot water. When the compound (A) is a polymer, the number of the ester bonds may preferably be 5% or less, based on the total number of monomer units.

Such a compound may more preferably be a polymer having a carbon-carbon double bond in the side-chain thereof. The polymer may be a homopolymer or a copolymer. Further, even when the polymer is a homopolymer (i.e., a polymer comprising one kind of monomer), the microstructure thereof may be different depending on the polymerization process therefor (e.g., conditions such as the catalyst and the temperature). For example, in the case of a homopolymer of butadiene, one mainly comprising monomer units having a 1,4-cis-linkage or 1,4-trans-linkage has a carbon-carbon double bond in the main chain thereof, and it assumes a rubbery state at ordinary (or normal) temperature. This polymer is generally called "polybutadiene rubber". On the other hand, a polymer mainly comprising monomer units (of 1,2-bonds) having a main chain constituted by 1-position carbon atoms and 2-position carbon atoms shows a so-called resinous state when the molecular weight thereof becomes relatively high. When the molecular weight thereof is relatively low (i.e., the degree of polymerization is low), it becomes a viscous liquid.

In the case of the above diene compounds, the monomer unit having a side-chain containing a carbon-carbon double bond and a saturated main chain may preferably refers to a monomer unit having a 1,2-linkage. Further, the "total number of monomer units" refers to the total number of moieties (or residues) each of which corresponds to each of the monomers, which are the raw material for providing the polymer. For example, in the case of polybutadiene, the total number of monomer units is the total number of monomer units which have been obtained by counting the monomers corresponding to the 1,2-linkages, 1,4-cis-linkages, 1,4-trans-linkages as one kind of monomer units. If one kind of monomer is copolymerized with another kind of monomer, each of the other kind of monomers is counted as one monomer unit.

In the present invention, the ratio of the monomer unit having a side-chain containing a carbon-carbon double bond and a saturated main chain may preferably be 60 mole % or more, more preferably 70 mole % or more, particularly 85 mole % or more, based on the total number of monomer units constituting the polymer. If the ratio of the above monomer unit is less than 60 mole %, the resultant curing property can be insufficient in some cases, even when the carbon-carbon double bond of the side chain is subjected to the reaction so as to provide a cured product. Further, in such a case, the bending modulus of elasticity, bending strength, and Tg (glass transition temperature) of the cured product including the carbonaceous material also tend to be decreased.

The monomer unit having a side-chain containing a carbon-carbon double bond and a saturated main chain may preferably be a monomer unit represented by the following formula (1) and/or formula (2):

(Diene Polymer)

In the present invention, the polymer containing 60 mole % or more of the monomer unit having a side-chain containing a carbon-carbon double bond and a saturated main chain may preferably be a polymer comprising the above-mentioned diene compound (such as butadiene, pentadiene, and isoprene) as a main monomer. In the present invention, the main monomer refers to a monomer constituting 50 mole % or more of the raw material monomer) for providing the polymer. In the present invention, such a polymer containing 60 mole % or more of the monomer unit having a side-chain containing a carbon-carbon double bond and a saturated main chain may be referred to as "diene polymer" in some cases. The diene polymer may be a copolymer of a plurality of diene compound monomers. Further, the carbon-carbon double bonds of the side chain may be partially hydrogenated. In this case, the hydrogenated portion of the carbon-carbon double bonds becomes a saturated carbon-carbon linkage.

Specific examples of the diene polymer usable in the present invention may include: 1,2-polybutadiene, 3,4-polypentadiene, 3,4-polyisoprene, polycyclopentadiene, etc. However, the diene polymer usable in the present invention is not particularly limited to these specific examples. In the present invention, the diene polymer may preferably be 1,2-polybutadiene, 3,4-polyisoprene, more preferably 1,2-polybutadiene. These polymers can also comprise other monomer units corresponding to the 3,4-linkage of polybutadiene as a microstructure. Further, a monomer other than the diene compound can also be copolymerized with the diene compound. Specific examples of the monomer other than the diene compound may include: maleic anhydride, methacrylic acid, etc. The ratio of the monomer units corresponding to the 3,4-linkage and the monomer units corresponding to other monomers may preferably be below 40 mole %, more preferably below 30 mole %, particularly below 15 mole %, of the total number of monomer units.

The diene polymer is characterized in that its surface tension is low. The surface tension is a parameter indicating the hydrophobicity and/or hydrophilicity of the surface of a substance. The polymer as the component (A) in the present invention may preferably be hydrophobic. If the hydrophilicity becomes large, the affinity with water is increased and, as a result, the hydrothermal resistance tends to be decreased. Accordingly, an excessive hydrophilicity is not preferred.

The process for synthesizing such a diene polymer is not particularly limited. Specific examples of the synthesizing process may include: those as described in "Experiment Example 2.20 Synthesis of 1,2-polybutadiene and cis-1,4-polybutadiene by cobalt catalyst", pp. 41, in "4th Edition Experimental Chemistry Series (Jikken Kagaku Kouza), Polymer Synthesis", 4th ed., edited by Chemical Society of Japan, May 6, 1992, published by Maruzen K.K.; or "Experiment Example 2.26 Synthesis of 3,4-polyisoprene by (Pr—O)$_4$Ti-Organic Aluminum-type Catalyst", pp. 48, in "4th Edition Experimental Chemistry Series, Polymer Synthesis", 4th ed., edited by Chemical Society of Japan, May 6, 1992, published by Maruzen K.K. However, the synthesis process usable in the present invention is not particularly limited to these specific examples.

Further, the method of confirming the microstructure of the thus synthesized diene polymer is not particularly limited, but the microstructure can be confirmed by any method. For example, in the present invention, the microstructure can be confirmed by a nuclear magnetic resonance method (hereinafter, abbreviated as "NMR method"); or by a Fourier transform infrared spectroscopy (hereinafter, abbreviated as "FT-IR method"), etc. Specific examples thereof may include: an article entitled "Experiment Example 223 Measurement of microstructure of polybutadiene by infrared spectra" pp. 45, in "Experimental Procedure for Polymer Synthesis (Koubunshi Gosei no Jikken-Ho)", 8th impression, Mar. 1, 1984, published by Kagakudoujin K.K.; an article entitled "Experiment Example 225 Measurement of microstructure of polybutadiene by NMR" pp. 49, in "Experimental Procedure for Polymer Synthesis", 8th impression, Mar. 1, 1984, published by Kagakudoujin K.K.; or an article entitled "Experiment Example 226 Measurement of microstructure of polyisoprene by NMR" pp. 51, in "Experimental Procedure for Polymer Synthesis", 8th impression, Mar. 1, 1984, published by Kagakudoujin K.K. In the present invention, the microstructure is measured by the above-mentioned NMR method.

In the present invention, the branched structure or terminal structure of the diene polymer is not particularly limited, but those which have been modified or denatured in various manners can also be used. Specific examples thereof may include: those having various kinds of structures such as acrylic-modified structures, methacrylic-modified structures, carboxy-modified structures, maleic anhydride-modified structures, epoxy-modified structures, etc. However, the structures of the diene polymer usable in the present invention is not particularly limited to these specific examples.

In the present invention, a diene polymer wherein the carbon-carbon double bonds constituting at least one side chain thereof have been partially hydrogenated (hereinafter, sometimes referred to as "partially hydrogenated diene polymer") may preferably be 1,2-polybutadiene or 3,4-polyisoprene wherein the carbon-carbon double bonds constituting at least one side chain thereof have been partially hydrogenated so as to form a saturated linkage. For example, the partially hydrogenated 1,2-polybutadiene may preferably be constituted by monomer units represented by the following formula (1) and formula (3):

The method of hydrogenating the carbon-carbon double bond in the side chain of a diene polymer in the present invention is not particularly limited. For example, such hydrogenation can be conducted by adding hydrogen gas in the co-presence of a metal catalyst. The metal catalyst usable in the present invention is not particularly limited, and specific examples of the metal catalyst may include nickel, palladium, platinum, ruthenium, cobalt, copper, etc. Further, the catalyst may be in the form of a metal, per se, or in the form of a supported-type catalyst. The support or carrier therefor may include: activated carbon, alumina, silica, etc. Preferred examples of the catalyst may include a sponge-type nickel catalyst.

The hydrogenation rate for the partially hydrogenated diene polymer in the present invention may preferably be 3-90 mole %, more preferably 5-70 mole %, particularly preferably 10-50 mole %, based on the carbon-carbon double bonds of the side chain. If the hydrogenation rate is less than 3 mole %, the effect of the improvement in the cured product property tends to be insufficient. If the hydrogenation rate exceeds 90 mole %, the curing characteristic tends to be deteriorated.

The compounding (or mixing) ratio (mass ratio) of the partially hydrogenated diene polymer and the non-hydrogenated diene polymer in the present invention may preferably be 5/95-80/20, more preferably 10/90-65/45, particularly preferably 20/80-50/50. If the compounding ratio of the partially hydrogenated diene polymer is less than 5 mass %, the effect of the improvement in the cured product property tends to be insufficient. If the compounding ratio exceeds 80 mole %, the curing characteristic tends to be deteriorated.

(Mass Ratio of Component A and Component B)

The mass ratio of the hydrocarbon compound having a plurality of carbon-carbon double bond as the component (A), and the carbonaceous material as the component (B) may preferably be 0.01:1 to 4:1, more preferably 0.01:1 to 1.5:1. When the mass ratio of the component (A) exceeds 4 times that of the carbon material (B), the electroconductivity of the cured product undesirably tends to become low. Further, the addition amount of the component (A) is less than 0.01 times that of the carbon material (B), the moldability undesirably tends to become poor. Further, when a reactive monomer as the component (C) is used, it is possible to use the sum of the component (A) and the component (C), instead of the above-mentioned component (A), with respect to the mass ratio thereof.

(Reactive Monomer)

The curable composition according to the present invention may comprise a reactive monomer (C), as desired. The reactive monomer usable in the present invention is not particularly limited, but various kinds of reactive monomers are useable. For example, it is possible to add a monomer having a radical reactivity containing an unsaturated double bond such as vinyl group and allyl group, for the purpose of controlling the rate of reaction, adjusting the viscosity, improving the crosslinking density, adding a certain function, etc. Specific examples of the radically reactive monomer containing an unsaturated double bond such as vinyl group and allyl group, may include: unsaturated fatty acid esters, aromatic vinyl compounds, vinyl esters of aromatic carboxylic acid or saturated fatty acids, and derivatives thereof, crosslinking polyfunctional monomers, etc.

(Unsaturated Fatty Acid Ester)

Specific examples of the above-mentioned unsaturated fatty acid ester may include: alkyl(meth)acrylates such as methyl(meth)acrylate, ethyl(meth)acrylate, butyl(meth)acrylate, 2-ethyl hexyl(meth)acrylate, octyl(meth)acrylate, dodecyl(meth)acrylate, octadecyl(meth)acrylate, cyclohexyl (meth)acrylate, methyl cyclohexyl(meth)acrylate; acrylic acid aromatic esters such as phenyl(meth)acrylate, benzyl (meth)acrylate, 1-naphthyl (meth)acrylate, fluorophenyl (meth)acrylate, chlorophenyl(meth)acrylate, cyanophenyl (meth)acrylate, methoxyphenyl(meth)acrylate, biphenyl (meth)acrylate; haloalkyl(meth)acrylates such as fluoromethyl(meth)acrylate, chloromethyl(meth)acrylate; Glycidy (meth)acrylate, alkylamino(meth)acrylate, α-cyano acrylic acid ester, etc.

(Aromatic Vinyl Compound, etc.)

Specific examples of the above aromatic vinyl compound may include: styrene, α-methyl styrene, chlorostyrene, styrene sulfonic acid, 4-hydroxy styrene, vinyl toluene, etc.

Specific examples of the above vinyl ester of aromatic carboxylic acid or saturated fatty acid, and derivatives thereof may include: vinyl acetate, vinyl propionate, vinyl benzoate, etc.

(Crosslinking Polyfunctional Monomer)

Specific examples of the above-mentioned crosslinking polyfunctional monomer may include: di(meth)acrylates such as ethylene glycol di(meth)acrylate, diethylene glycol di(meth)acrylate, triethylene glycol di(meth)acrylate, tetraethylene glycol di(meth)acrylate, tripropylene glycol di(meth)acrylate, 1,3-butyleneglycol di(meth)acrylate, 1,4-butanediol di(meth)acrylate, 1,5-pentadiol di(meth)acrylate, 1,6-hexadiol di(meth)acrylate, neopentylglycol di(meth) acrylate, oligoester di(meth)acrylate, polybutadiene(meth) acrylate, 2,2-bis (4-(meth) acryloyloxyphenyl) propane, 2,2-bis (4-ω-(meth)acryloyloxy ethoxy) phenyl) propane; aromatic carboxylic acid diallyl compounds such as phthalic acid diallyl ester, isophthalic acid diallyl ester, isophthalic acid dimetallyl ester, terephthalic acid diallyl ester, 2,6-naphthalene dicarboxylic acid diallyl ester, 1,5-naphthalene dicarboxylic acid diallyl ester, 1,4-xylene dicarboxylic acid allyl ester, 4,4'-diphenyl dicarboxylic acid diallyl ester; crosslinking bifunctional monomers such as cyclohexane dicarboxylic acid diallyl ester, divinylbenzene; crosslinking trifunctional monomers such as trimethylolethane tri(meth)acrylate, trimethylolpropane tri(meth)acrylate, penta erythritol tri(meth)acrylate, tri(meth)allyl isocyanurate, tri(meth)allyl cyanurate, triallyl tritrimellitate, diallyl chlorendate; crosslinking tetrafunctional monomers such as pentaerythritol tetra(meth)acrylate, etc.

Among these reactive monomers (C), it is preferred to add a crosslinking polyfunctional monomer in order to improve the thermal resistance and the hydrothermal resistance. The amount of the reactive monomers (which can have a linkage portion susceptible to hydrolysis, such as ester bond and urethane bond) to be used for such a purpose may preferably be as small as possible, in view of the prevention of the hydrolysis by hot water. However, it is possible to use an appropriate amount of the reactive monomer, in view of the balance with respect to another property.

The amount of the reactive monomer (C) to be used in the present invention may preferably be 1-40 mass parts, more preferably 2-30 mass parts, particularly 3-25 mass parts, based on the 100 mass parts of hydrocarbon compound (A) having a plurality of carbon-carbon double bond. When the amount of the reactive monomer (C) exceeds 40 mass parts, the hydrothermal resistance of the cured product (such as fuel cell separator) in the present invention can be insufficient in some cases.

(Carbonaceous Material)

The carbonaceous material as the component (B) for use in the present invention is not particularly limited. It is preferred to use, for example, at least one or more material selected from the group consisting of natural graphites, artificial graphites, expanded graphites, carbon blacks, carbon fibers, vapor grown carbon fibers and carbon nanotubes.

Among these, particularly preferred carbonaceous materials are natural graphite, artificial graphite, vapor grown carbon fibers and carbon nanotubes. The carbonaceous material may more preferably be one containing boron.

The carbonaceous material as the component (B) for use in the present invention may preferably have a powder electric resistivity as low as possible in the direction at right angles to the pressure direction when the bulk density is 1 g/cm$^3$. The powder electric resistivity may preferably be 0.1 Ωcm or less, more preferably 0.07 Ωcm or less. If the electric resistivity of the carbonaceous material as the component (B) exceeds 0.1 Ωcm, the cured product obtained by curing the composition is liable to be decreased in the electroconductivity and a desired cured product is less liable to be obtained.

(Method of Measuring the Electric Resistivity)

Figure 1:
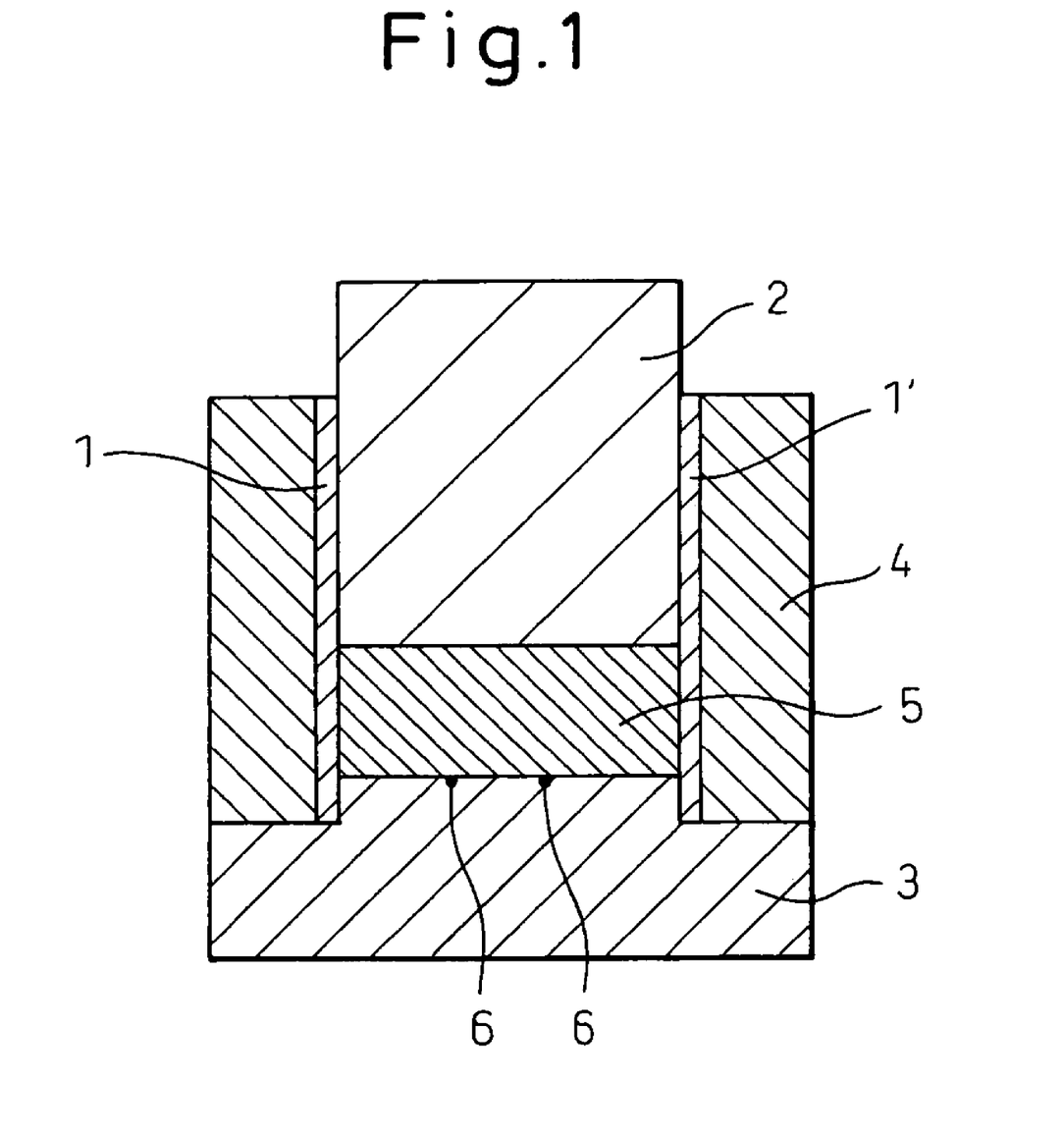
FIG. 1 is a schematic view showing a method of measuring the electric resistivity of a carbonaceous material powder.

FIG. 1 shows a method of measuring the electric resistivity of the carbonaceous material for use in the present invention. In FIG. 1, the reference numerals 1 and 1' denote electrodes comprising a copper plate, the reference numeral 2 denotes a compression rod comprising a resin, the reference numeral 3 denotes a pedestal comprising a resin, the reference numeral 4 denotes a side frame comprising a resin, the reference numeral 5 denotes a sample carbonaceous material, and the reference numeral 6 denotes a voltage probe provided in the center part in the direction vertical to the sheet surface at the lower end of the sample.

By use of this four-probe method shown in FIG. 1, the electric resistivity of a sample may be measured as follows. A sample is compressed by the compression rod 2. An electric current (I) is passed from the electrode 1 to the electrode 1'. The voltage (V) between the probes is measured by the probe 6. At this time, a value when the sample is compressed to a bulk density of 1.5 g/cm$^3$ by the compression rod is used for the voltage.

Assuming that the electric resistance (between probes) of the sample is R(Ω), R=V/I. From this formula, the electric resistivity can be determined according to $\rho = R \cdot S/L$ [ρ: electric resistivity, S: cross-sectional area (cm$^2$) in the direction right angled to the current passing direction of the sample, namely, the pressure direction, L: distance between the probes 6 (cm)]. In the actual measurement, the cross section of the sample in the right angle direction has a width of about 1 cm and a length (height) of 0.5 to 1 cm, the length in the current passing direction is 4 cm, and the distance (L) between the probes is 1 cm.

(Artificial Graphite)

In order to obtain artificial graphite as one example of the carbonaceous material as the component (B) for use in the present invention, in general, coke is first produced. The starting material of the coke is petroleum pitch, coal pitch or the like and this starting material is carbonized into coke. From the coke, graphite powder is generally obtained by, for example, a method of pulverizing and then graphitizing the coke, a method of graphitizing the coke itself and then pulverizing the graphitized coke, or a method of adding a binder to the coke, forming and baking the resultant mixture, and graphitizing and then pulverizing the baked product (hereinafter, the coke and the baked product are collectively called "coke and the like") into powder. The starting material coke and the like may preferably be hindered from the growth of crystal and preferably heat-treated at 2,000° C. or less, more preferably 1,200° C. or less.

The method of graphitization is not particularly limited, but the graphitization may be performed by, for example, a method of using an Acheson furnace where the powder is enclosed in a graphite crucible and an electric current is directly passed therethrough, or a method of heating the powder by means of a graphite heating element.

The carbonaceous material (B) such as coke, artificial graphite and natural graphite can be pulverized by using a high-speed rotary mill (e.g., hammer mill, pin mill, cage mill), a ball mill (e.g., roll mill, vibrating mill, planetary mill) or a stirring mill (e.g., bead mill, attritor, flow tube-type mill, annular mill). In addition, a fine pulverizer such as screen mill, turbo mill, super micron mill and jet mill may also be used by selecting the conditions. The carbonaceous material (B) such as coke and natural graphite is pulverized by using such a mill and, by selecting the pulverization conditions and if desired, classifying the powder, whereby the average particle size and the particle size distribution can be controlled.

The method of classifying the carbonaceous material (B) such as coke, artificial graphite and natural graphite may be any method as long as the separation can be attained. For example, sieving or an air classifier such as forced vortex-type centrifugal classifier (e.g., micron separator, turboplex, turbo classifier, super separator) and inertial classifier (e.g., reformed virtual impactor, elbow jet) may be used. Also, a wet precipitation separation method, a centrifugal classification method or the like may be used.

(Expanded Graphite Powder)

The expanded graphite powder to be used as the carbonaceous material (B) in the present invention may be, for example, a powder obtained by a method where a graphite having a highly-grown crystal structure such as natural graphite and pyrolytic graphite is dipped in a strongly oxidative solution such as a mixed solution of concentrated sulfuric acid and nitric acid or a mixed solution of concentrated sulfuric acid and aqueous hydrogen peroxide to produce a graphite intercalation compound and the graphite intercalation compound produced is washed with water and rapidly heated to expand the graphite crystal in the C-axis direction, or a powder obtained by once rolling the powder obtained above into a sheet and then pulverizing the sheet.

(Carbon Fiber)

Specific examples of the carbon fiber to be used as the carbonaceous material (B) include a pitch-type carbon fiber obtained from heavy oil, by-product oil or coal tar, and a PAN-type carbon fiber obtained from polyacrylonitrile.

The vapor grown carbon fiber to be used as the carbonaceous material (B) may be obtained, for example, by causing a thermal decomposition reaction using a starting material organic compound such as benzene, toluene or natural gas together with a hydrogen gas at from 800 to 1,300° C. in the presence of a transition metal catalyst such as ferrocene. The obtained vapor grown carbon fiber may preferably be further subjected to a graphitization treatment at about 2,500 to 3,200° C., more preferably a graphitization treatment together with a graphitization catalyst such as boron, boron carbide, beryllium, aluminum or silicon at about 2,500 to 3,200° C.

The vapor grown carbon fiber for use in the present invention may preferably have a fiber diameter of 0.05 to 10 μm and a fiber length of 1 to 500 μm. The fiber diameter may more preferably be from 0.1 to 5 μm, a fiber length of 5 to 50 μm, most preferably from 0.1 to 0.5 μm, and a fiber length of 10 to 20 μm.

(Carbon Nanotube)

The carbon nanotube to be used as the carbonaceous material (B) has recently been noticed by industry not only by its mechanical strength but also by its field emission function and hydrogen absorption function and, furthermore, its magnetic function. This carbon nanotube is also called graphite whisker, filamentous carbon, graphite fiber, extra fine carbon tube, carbon tube, carbon fibril, carbon microtube or carbon nanofiber.

The carbon nanotube includes a single layer carbon nanotube where a graphite film forming the tube is a single layer, and a multilayer carbon nanotube where the graphite film is composed of multiple layers. In the present invention, either may be used but a single carbon nanotube is preferred because a cured product having a higher electroconductivity or mechanical strength can be obtained.

The carbon nanotube may be manufactured, for example, by an arc discharge method, a laser evaporation method or a thermal decomposition method, which are described in *Carbon Nanotube no Kiso* (*Fundamental Study of Carbon Nanotube*), written by Saito and Bando, pages 23 to 57, Corona Sha (1998). For enhancing the purity, the carbon nanotube obtained may further be purified by a hydrothermal method, a centrifugal separation method, an ultrafiltration method, an oxidation method or the like. For removing impurities, the carbon nanotube may preferably be subjected to a high-temperature treatment in an inert gas atmosphere at about 2,500 to 3,200° C., more preferably a high-temperature treatment at about 2,500 to 3,200° C. in an inert gas atmosphere together with a graphitization catalyst such as boron, boron carbide, beryllium, aluminum and silicon.

The carbon nanotube for use in the present invention may preferably have a fiber diameter of 0.5 to 100 nm and a fiber length of 0.01 to 10 μm. The fiber diameter may more preferably be 1 to 10 nm, a fiber length of 0.05 to 5 μm, still more preferably 1 to 5 nm, and a fiber length of 0.1 to 3 μm.

The fiber diameter and fiber length of the vapor grown carbon fiber and carbon nanotube for use in the present invention can be measured by using a scanning electron microscope (SEM).

More specifically, in this measurement, the diameters and lengths of several hundreds pieces of fibers are measured, the number-average values of these diameters and lengths are calculated.

(Carbon Black)

Specific examples of the carbon black for use in the present invention may include Ketjen black and acetylene black which are obtained by the incomplete combustion of a natural gas and the like or by the thermal decomposition of acetylene, a furnace carbon obtained by the incomplete combustion of a hydrocarbon oil or a natural gas, and a thermal carbon obtained by the thermal decomposition of a natural gas.

(Boron Content)

The amount of boron contained in the carbonaceous material as the component (B) according to the present invention may preferably be from 0.05 to 10 mass %. If the amount of boron is less than 0.05 mass %, the objective graphite powder having a high electroconductivity is less liable to be obtained. Even if the amount of boron exceeds 10 mass %, the effect of improving the electroconductivity of the carbon material tends to be decreased.

The method of measuring the quantity of boron contained in the carbonaceous material is not particularly limited, but the quantity of the boron can be measured by any measurement method. In the present invention, the values thereof may be those determined by an inductive-type (or inductively coupled) plasma emission spectrometry (hereinafter, abbreviated as "ICP"), or an inductive-type (or inductively coupled) plasma emission spectrometry mass spectrometry (hereinafter, abbreviated as "ICP-MS"). More specifically, sulfuric acid and nitric acid are added to a sample and microwave-heated (230° C.) to be decomposed (digester method), and perchloric acid ($HClO_4$) is further added to the decomposition product, and the resultant product is diluted with water. Then, the thus obtained sample is subjected to an ICP emission spectrometer, to thereby measure the quantity of the boron therein.

The carbonaceous material (B) to be used in the present invention may preferably be one containing 0.05 mass % to 10 mass % of boron. Into the carbonaceous material as the component (B), boron can be incorporated, for example, by a method of adding a boron source such as B in elemental form, $B_4C$, BN, $B_2O_3$ or $H_3BO_3$ to a single substance of natural graphite, artificial graphite, expanded graphite, carbon black, carbon fiber, vapor grown carbon fiber, carbon nanotube or the like, or a mixture of one or more thereof, thoroughly mixing the boron compound, and then graphitizing the mixture at about 2,500 to 3,200° C.

If the mixing of boron compound is not uniform, the resulting graphite powder is not only non-uniform but also highly probably sintered at the graphitization. For attaining uniform mixing, the boron source may preferably be formed into powder having a particle size of 50 μm or less, preferably about 20 μm or less and then mixed with the powder of coke or the like.

If the carbonaceous material as the component (B) does not contain boron and is graphitized, the graphitization degree (i.e., crystallinity) can be decreased and the lattice spacing thereof can be increased. As a result, a graphite powder having a high electroconductivity is less liable to be obtained.

The form of boron contained is not particularly limited as long as boron and/or a boron compound is mixed in the graphite. However, in a preferred form, boron is present between layers of graphite crystal or a boron atom is substituted to a part of carbon atoms constituting the graphite crystal. In a case where a part of carbon atoms is substituted by a boron atom, the bonding between the boron atom and the carbon atom may be in any bonding form such as covalent bonding or ionic bonding.

(Additive)

For the purpose of improving hardness, strength, electroconductivity, moldability, durability, weather resistance, water resistance and the like, the curable resin composition having a hydrothermal resistance according to the present invention may further contain additives such as lubricants, thickeners, crosslinking agents, crosslinking auxiliaries, curing initiators, curing accelerators, curing retarder, plasticizers, shrinkage-reducing agents, thixotropic agents, surfactants or detergents, and solvents glass fibers, organic fibers, an ultraviolet stabilizer, an antioxidant, a defoaming agent, a leveling agent, a mold releasing agent, a lubricant, a water repellent, a thickener, a hydrophilicity-imparting agent, and a curing auxiliary.

As the curing initiator, it is preferred to use a compound which can produce radicals by heat, such as organic peroxides and azo compounds. Specific examples of the organic peroxide may include: known peroxides such as a dialkyl peroxides, acyl peroxides, hydroperoxides, ketone peroxides, and peroxy esters. Specific examples thereof may include: benzoyl peroxide, 1,1-bis (t-butyl peroxy) cyclohexane, 2,2-bis (4,4-dibutyl peroxyl cyclohexyl) propane, t-butyl peroxyl-2-ethyl hexanate, 2,5-dimethyl 2,5-di(t-butyl peroxyl) hexane, 2,5-dimethyl 2,5-di(benzoyl peroxy) hexane, t-butyl peroxy benzoate, t-butyl cumyl peroxide, p-methane hydro peroxide, t-butyl hydroperoxide, cumene hydroperoxide, dicumyl peroxide, di-t-butyl peroxide, 2,5-,5-dimethyl-2 dibutylperoxy hexyne-3, etc.

It is preferred to add an organic peroxide or azo compound to be contained in the curable composition as desired, in an amount of 0.2-10 mass parts, with respect to 100 mass parts of (the component (A)+the component (C)). The amount the organic peroxide to be added may more preferably be 0.5-8 mass parts, particularly 0.8-6 mass parts. If the amount the organic peroxide exceeds 10 mass parts, the gas resulting from the decomposition of the organic peroxide is increased, so that the gas tightness of the cured product can be decreased. Further, if the amount the organic peroxide is less than 0.2 mass parts, the crosslinking density of the cured product can be decreased so as to decrease the strength thereof and, further, the durability can also be decreased.

(Preparation of Curable Composition)

The production process for the curable resin composition according to the present invention is not particularly limited. To obtain the hydrothermally resistant curable resin composition according to the present invention, the above-described components may preferably be mixed uniformly while constantly maintaining a temperature not causing the initiation of curing by using a mixer or kneader commonly used in the field of resin, such as roll, extruder, kneader, Banbury™ mixer, Henschel™ mixer or planetary mixer. In the case of adding an organic peroxide, the organic peroxide may preferably be added and mixed at the final stage after all other components are uniformly mixed.

For the purpose of facilitating the supply of the materials to a molding machine or a mold, the curable composition according to the present invention can be pulverized or granulated after kneading or mixing.

The curable composition can be pulverized by using a homogenizer, a Wiley mill, a high-speed rotary mill (e.g., hammer mill, pin mill, cage mill, blender) or the like. The pulverization may preferably be performed while cooling so as to prevent the materials from aggregating with each other. The granulation may be performed by a method of pelletizing the composition by using an extruder, or a co-kneader, or by using a pan-type granulator.

(Molding of Curable Composition)

For the purpose of obtaining a cured product having a precise thickness, the obtained curable composition may be once molded into a sheet form having a predetermined thickness and a predetermined width at a temperature at which no curing is initiated, by using an extruder, a roll, a calender, etc. In order to conduct molding so as to provide a higher thickness precision, it is preferred that the composition is molded by an extruder, and then rolled by a roll or calender. For the purpose of obviating voids or air in the sheet, it is preferred to use extrusion in a vacuum.

The thus obtained sheet may be cut or punched so as to provide an intended size, and the resultant sheet is inserted into a mold having both-side grooves in the form of one sheet or two or more sheets in a parallel or superposed state, and then is heat-cured by a compression molding machine to thereby obtain a cured product. In order to obtain a good product substantially having no defects, it is preferred to provide a vacuum inside the cavity. After the curing, in order to straighten the warping of the product, it is preferred to cool the product while pressing the product at a pressure of 3 MPa or more with a presser bar of which temperature is controlled to 10-50° C.

(Curing)

With respect to the curing conditions, it is possible to select and find an optimum temperature according to the kind of the composition. The temperature may be appropriately selected according to the kind of the materials, but for example, a temperature of 120 to 200° C. for 30 to 1,200 seconds may be selected. After the composition is cured, after-curing is applied at a temperature of 150 to 200° C. for 10 to 600 minutes, whereby complete curing can be achieved. By performing the after-curing under a pressure of 5 MPa or more, the product can be prevented from warping.

(Properties of hydrothermally resistant electroconductive cured product) The thus cured hydrothermally resistant electroconductive cured product according to the present invention may preferably have a Tg of 160° C. or more, more preferably 170° C., and particularly preferably 180° C. or more. If the Tg is lower than 160° C., the obtained cured product is less liable to have a sufficient thermal resistance.

The Tg may be measured by a TMA method by using a Thermo-analyzer (TMA-50) manufactured by Shimadzu Corporation. In this measurement, in an atmosphere of nitrogen supply of 50 mL/min., the coefficient of linear expansion is measured from 30° C. to 250° C. at a temperature increasing rate of 5° C./min., by using a sample having a size of 3×3×5 (mm), so as to detect the discontinuity point, to thereby determine the Tg The hydrothermally resistant electroconductive cured product according to the present invention may preferably have a bending strength of 30 MPa or more. The bending strength may more preferably be 35 MPa or more, particularly preferably 40 MPa or more. If the bending strength is smaller than 30 MPa, the provided cured product is less liable to have a sufficient strength. The bending strength may be measured by a method prescribed in JIS K 6911. More specifically, a test piece or specimen (80 mm×10 mm×4 mm) is subjected to the three-point bending strength measurement under the conditions of a span space of 64 mm and a bending speed of 2 mm/min.

The hydrothermally resistant electroconductive cured product according to the present invention may preferably have a volume resistivity of $2 \times 10^{-2}$ Ωcm or less, more preferably $8 \times 10^{-3}$ Ωcm or less, particularly $5 \times 10^{-3}$ Ωcm or less. If the volume resistivity exceeds $2 \times 10^{-2}$ Ωcm, a sufficient electroconductivity is less liable to be obtained. The volume resistivity is measured by the four-point probe method in accordance with JIS K 7194.

The hydrothermally resistant electroconductive cured product according to the present invention may preferably have a contact resistance of $2 \times 10^{-2}$ Ωcm² or less, more preferably $1 \times 10^{-2}$ Ωcm² or less, still more preferably $7 \times 10^{-3}$ Ωcm² or less. If the contact resistance exceeds $2 \times 10^{-2}$ Ωcm², a sufficient electroconductivity is less likely to be obtained. The contact resistance value was determined as follows. A test piece (20 mm×20 mm×2 mm) and a carbon plate (1.5×$10^{-3}$ Ωcm, 20 mm×20 mm×1 mm) are contacted with each other, and then sandwiched by two copper plates, and a load of 98 N is applied thereon. A constant current of 1 A is passed in the through direction and probes were contacted to the interface between the test piece and the carbon plate to measure the voltage. From the voltage measured, the resistance value is calculated. The value obtained was integrated with the contacting cross-sectional area and the resulting value is designated as the contact resistant value.

The hydrothermally resistant electroconductive cured product according to the present invention may preferably have a heat conductivity of 1.0 W/m·K or more, more preferably 4.0 W/m·K or more, still more preferably 10 W/m·K or more. If the heat conductivity is below 1.0 W/m·K, the heat-radiating property of the material becomes poor, and the material can undesirably be heated to a high temperature. The thermal conductivity may be measured by using a specimen (diameter φ: 10 mm, thickness: 1.7 mm) at a temperature of 80° C. in vacuum by irradiating a ruby laser beam (excitation voltage: 2.5 kV) according to the laser-flash method ($t_{1/2}$ method, thermal constant measuring apparatus for laser-flash method: LF/TCM FA8510B mfd. by Rigaku Denki Co.).

(Hydrothermal Resistance)

The hydrothermally resistant electroconductive cured product according to the present invention is characterized in that the hydrothermal resistance thereof can be increased. Specific examples of the index of the hydrothermal resistance may include, e.g., water absorption, and rate of mass change. These values may be measured by a method according to JIS K 7202.

For example, a test piece having a constant size is placed pressure-resistant container, and a constant volume of distilled water is added thereto, and is subjected to a test in an oven at a constant temperature for a predetermined time. The change in the mass of the test piece before and after the test is measured, whereby the hydrothermal resistance can be determined.

The hydrothermally resistant electroconductive cured product according to the present invention may preferably have a mass change in range of −1.5% to +1.5% after the 168 hr-test at 180° C., in the state where the size of the test piece 30 mm×30 mm×3 mm, and 50 ml of distilled water is added thereto. The mass change may more preferably be in the range −1.0% to +1.0%.

If the mass change is below −1.5%, or exceeds +1.5%, the mass change becomes too large in a long-time use thereof, and the dimension of molded product can be greatly changed undesirably. Further, if the mass change is below −1.5%, the material is more liable to be deteriorated and can produce cracks and fractures, and such a state is particularly unfavorable.

In the electroconductive cured product in the present invention, it is preferred to maintain a good balance between the bending strength (at the time of breakage), and the bending strain (at the time of breakage). The cured product wherein only the bending strength is large, is liable to be a fragile material. Further, the cured product wherein only the strain is large, is liable to provide a poor strength. Therefore, it is preferred to prepare a cured product wherein the bending strength and the strain are well balanced. From such a point of view, the hydrothermally resistant electroconductive cured product which can be obtained from the curable composition in the present invention shows an excellent performance showing balanced bending strength and strain.

(Boron Content in Cured Product)

The hydrothermally resistant electroconductive cured product according to the present invention may preferably contain 0.1 ppm or more of boron. The boron content may more preferably be 0.5 ppm or more, still more preferably 1 ppm or more. If the boron content less than 0.1 ppm, a high electroconductivity is less liable to be obtained. The boron content in such a case may also be measured in the same manner as in the case of the carbonaceous material (B), and the ICP-MS method should be used.

(Hydrothermally Resistant Electroconductive Molded Product)

In the hydrothermally resistant electroconductive molded product according to the present invention wherein a flow channel (or flow path) or a plurality of flow channels for a gas have been formed on one side or both sides thereof, specific examples of the gas to be circulated may include: air, oxygen, hydrogen, nitrogen, steam, etc. Further, it is possible to appropriately set or design the shape and size of the channel for the gas, depending on the use and size of the molded product.

The hydrothermally resistant electroconductive molded product according to the present invention wherein at least one flow channel for a gas has been formed on one side or both sides thereof, may preferably have a Tg of 160° C. or more, more preferably 170° C., and particularly preferably 180° C. or more. If the Tg is lower than 160° C., the obtained molded product is less liable to have a sufficient thermal resistance.

The hydrothermally resistant electroconductive molded product according to the present invention wherein at least one flow channel for a gas has been formed on one side or both sides thereof may preferably have a bending strength of 30 MPa or more. The bending strength may more preferably be 35 MPa or more, particularly preferably 40 MPa or more. If the bending strength is smaller than 30 MPa, the provided molded product is less liable to have a sufficient strength.

The hydrothermally resistant electroconductive molded product according to the present invention wherein at least one flow channel for a gas has been formed on one side or both sides thereof may preferably have a volume resistivity of $2 \times 10^{-2}$ Ωcm or less, more preferably $8 \times 10^{-3}$ Ωcm or less, particularly $5 \times 10^{-3}$ Ωcm or less. If the volume resistivity exceeds $2 \times 10^{-2}$ Ωcm, a sufficient electroconductivity is less liable to be obtained.

The hydrothermally resistant electroconductive molded product according to the present invention wherein at least one flow channel for a gas has been formed on one side or both sides thereof may preferably have a contact resistance of $2\times10^{-2}$ Ωcm$^2$ or less, more preferably $1\times10^{-2}$ Ωcm$^2$ or less, still more preferably $7\times10^{-3}$ Ωcm$^2$ or less. If the contact resistance exceeds $2\times10^{-2}$ Ωcm$^2$, a sufficient electroconductivity is less liable to be obtained.

The hydrothermally resistant electroconductive molded product according to the present invention wherein at least one flow channel for a gas has been formed on one side or both sides thereof may preferably have a heat conductivity of 1.0 W/m·K or more, more preferably 4.0 W/m·K or more, still more preferably 10 W/m·K or more. If the heat conductivity is below 1.0 W/m·K, the load to be applied to the material undesirably becomes too heavy.

The hydrothermally resistant electroconductive molded product according to the present invention wherein at least one flow channel for a gas has been formed on one side or both sides thereof may preferably contain 0.1 ppm or more of boron. The boron content may more preferably be 0.5 ppm or more, still more preferably 1 ppm or more. If the boron content less than 0.1 ppm, a high electroconductivity is less liable to be obtained.

It is possible to appropriately set or design the shape or size of the flow channel in the separator according to the present invention depending on the size, shape, and flow rated of gas for the separator per se. The section of the channel may generally be rectangular, the depth may be about 0.5 mm, and the width may be about 1.0 mm. However, the these values are not particularly limited to these specific examples.

The fuel cell separator according to the present invention wherein at least one flow channel for a gas has been formed on one side or both sides thereof, may preferably have a Tg of 160° C. or more, more preferably 170° C., and particularly preferably 180° C. or more. If the Tg is lower than 160° C., the obtained fuel cell separator is less liable to have a sufficient thermal resistance.

The fuel cell separator according to the present invention wherein at least one flow channel for a gas has been formed on one side or both sides thereof may preferably have a bending strength of 30 MPa or more. The bending strength may more preferably be 35 MPa or more, particularly preferably 40 MPa or more. If the bending strength is smaller than 30 MPa, the provided fuel cell separator is less liable to have a sufficient strength.

The fuel cell separator according to the present invention wherein at least one flow channel for a gas has been formed on one side or both sides thereof may preferably have a volume resistivity of $2\times10^{-2}$ Ωcm or less, more preferably $8\times10^{-3}$ Ωcm or less, particularly preferably $5\times10^{-3}$ Ωcm or less. If the volume resistivity exceeds $2\times10^{-2}$ Ωcm, a sufficient electroconductivity is less liable to be obtained.

The fuel cell separator according to the present invention wherein at least one flow channel for a gas has been formed on one side or both sides thereof may preferably have a contact resistance of $2\times10^{-2}$ Ωcm$^2$ or less, more preferably $1\times10^{-2}$ Ωcm$^2$ or less, still more preferably $7\times10^{-3}$ Ωcm$^2$ or less. If the contact resistance exceeds $2\times10^{-2}$ Ωcm$^2$, a sufficient electroconductivity is less liable to be obtained.

The fuel cell separator according to the present invention wherein at least one flow channel for a gas has been formed on one side or both sides thereof may preferably have a heat conductivity of 1.0 W/m·K or more, more preferably 4.0 W/m·K or more, still more preferably 10 W/m·K or more. If the heat conductivity is below 1.0 W/m·K, the load to be applied to the material undesirably becomes too heavy. Further, in such a case, it is not easy to control the working or operating temperature to a constant value, due to heat generation of the fuel cell separator.

The fuel cell separator according to the present invention wherein at least one flow channel for a gas has been formed on one side or both sides thereof may preferably contain 0.1 ppm or more of boron. The boron content may more preferably be 0.5 ppm or more, still more preferably 1 ppm or more. If the boron content less than 0.1 ppm, a high electroconductivity is less liable to be obtained.

The hydrothermally resistant electroconductive molded product according to the present invention wherein at least one flow channel for flowing a gas has been formed on one side or both sides thereof may be obtained by curing and shaping the curable composition according to the present invention using by a general molding method for a thermosetting resin.

(Process for Producing Fuel Cell Separator)

The process for producing the fuel cell separator according to the present invention is not particularly limited. Specific examples of the process may include: compression molding, transfer molding, injection molding, cast molding, injection-compression molding or the like is used. However, the molding process usable in the present invention is not particularly limited to these specific examples. The molding may preferably be performed while keeping the inside of mold or the mold as a whole under a vacuum state at various mold workings.

The fuel cell separator according to the present invention wherein at least one flow channel for a gas has been formed on one side or both sides thereof may be obtained by curing and shaping the curable composition according to the present invention using by a general molding method for a thermosetting resin. It is possible that the curable composition according to the present invention is once cured, and then the above-mentioned at least one flow channel (such as groove) is formed therein or thereon by machine work. It is also possible that the formation of the flow channel is conducted simultaneously with the curing of the curable composition by compression molding, etc., using mold having a reversed configuration corresponding to the flow channel.

Specific examples of the process for producing the fuel cell separator according to the present invention may include: compression molding, transfer molding, injection molding, cast molding, injection-compression molding or the like is used. However, the molding process usable in the present invention is not particularly limited to these specific examples. The molding may preferably be performed while keeping the inside of mold or the mold as a whole under a vacuum state at various mold workings.

In the compression molding, for enhancing the molding cycle, a multi-cavity mold may preferably be used. A multi-stage press (laminate press) method is more preferred, because a large number of products can be molded by a small output. In the case of a flat-type product, the compression molding may preferably be performed after once forming a non-cured sheet, so as to elevate the plane precision.

In the injection molding, for the purpose of further enhancing the moldability, the molding can be performed in a supercritical state by injecting a carbon dioxide gas from the half-way point of the molding machine cylinder and dissolving the gas in the materials. For enhancing the plane precision of a product, an injection-compression method is preferred.

The injection-compression molding method which can be used includes 1) a method of injecting the material in the state of the mold being closed and the locking force being set to zero, 2) a method of injecting the material in the state of the mold being opened to a predetermined position and then closing the mold and 3) a method of injecting the material in the state of the mold being opened and while injecting the material, closing the mold.

With respect to the mold temperature, it is important to select and find an optimum temperature according to the kind of the composition. The temperature may be appropriately selected according to the kind of the materials, but for example, a temperature of 120 to 200° C. for 30 to 1,200 seconds may be selected. After the composition is cured, after-curing is applied at a temperature of 150 to 200° C. for 10 to 600 minutes, whereby complete curing can be achieved. By performing the after-curing under pressure of 5 MPa or more, the product can be prevented from warping.

The curable composition according to the present invention is facilitated in the molding and therefore, is optimal as a composite material in the fields where the thickness precision is required. Further, the cured product thereof can reproduce the electroconductivity or heat conductivity of the carbonaceous material such as graphite without limit and can have very high performance by exhibiting excellent properties in the thermal resistance, hydrothermal resistance, corrosion resistance, molding precision and the like. Accordingly, the cured composition or product or article according to the present invention is useful for various parts in various fields. In particular, the cured product according to the present invention may suitably be used for fuel cell separators, electrodes, electromagnetic wave-shielding plates, heat-radiating materials, laminate or stacked product for batteries, electronic circuit boards, resistors, heaters, dust-collecting filter elements, plane-type heaters, electromagnetic materials, etc.

EXAMPLES

The present invention is described in more detail below by referring to Examples, but the present invention is by no means limited to these Examples.

<Component (A)>: Hydrocarbon Compound Having a Plurality of Carbon-Carbon Double Bond <A-1>
1,2-polybutadiene: B-3000, mfd. by Nippon Soda Co., Ltd. (molecular weight: 3,000, 1,2-linkage: 91.7%, viscosity at 50° C.: 10.7 Pa·s)

<A-2>
End-modified polybutadiene: TE-2000, mfd. by Nippon Soda Co., Ltd. (end methacryl-modified product, viscosity at 50° C.: 54.9 Pa·s, 1,2-linkage: 90% or more)

<A-3>
1,2-polybutadiene: RB-810, mfd. by JSR Co., Ltd. (150° C., melt index at 21.2 N: 3g/10 min., 1,2-linkage: 90%)

<A-4>
Partially hydrogenated 1,2-polybutadiene (26.8%)
500 g of a 40 mass %-cyclohexanone solution of 1,2-polybutadiene (B-3000) and 10 g of sponge nickel (R-239, mfd. by Nikko Rica Co., Ltd.) were charged into a 1000 ml-autoclave, and 20.6 L of hydrogen gas was introduced thereinto at conditions of 0.6 MPa and 40° C., to thereby cause a hydrogenated reaction. The cyclohexanone as the solvent was removed under reduced pressure, to thereby obtain 2 partially hydrogenated 1,2-polybutadiene having a hydrogenation rate of 26.8 mole % in the side chain vinyl group.

The partial hydrogenation rate was calculated by $^1$H-NMR analysis, on the basis of the area ratio between the signal of vinyl hydrogen (4.95-5.10 δ) in the side chain terminal and the methyl hydrogen (0.85-1.05 δ) in the side chain after the hydrogenated.

<A-5>
Partially hydrogenated 1,2-polybutadiene (50.8%)
Partially hydrogenated 1,2-polybutadiene having a hydrogenation rate of 50.8 mole % in the side chain vinyl group was obtained in the same manner as in the case of <A-4>, except that the amount of the hydrogen gas to be introduced was changed to 41.2 L.

<Component (B)>: Carbonaceous Material

<B-1>: Graphite Fine Powder Containing Boron
LPC-S Coke (hereinafter, referred to as "coke A") mfd. by Shin Nittetsu Kagaku K.K., which is a non-needle type coke (calcined product), was coarsely pulverized into a size of 2 to 3 mm or less by a pulverizer [mfd. by Hosokawa Micron K.K.]. The coarsely pulverized product was finely pulverized by a jet mill (IDS2UR, mfd. by Nippon Pneumatic K.K.). Thereafter, the thus obtained powder was classified so as to adjust the particle size thereof to a desired value. The particles of 5 μm or less were removed by air classification by using a turbo classifier (TC15N, mfd. by Nisshin Engineering K.K.).

To a portion (14.4 kg) of the finely pulverized product, 0.6 kg of boron carbide ($B_4C$) was added and then mixed therewith by a Henschel™ mixer at 800 rpm for 5 minutes. The resulting mixture was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. in an argon atmosphere. The resultant product was allowed to cool, the resultant powder was taken out from the crucible to thereby obtain 14 kg of graphite powder. The thus obtained graphite powder had an average particle size of 20.5 μm, and a boron content of 1.3 mass %.

<B-2>: Graphite Fine Powder without Boron
Coke A was coarsely pulverized by a pulverizer into a size of 2 to 3 mm and this coarsely pulverized product was finely pulverized by a jet mill. Thereafter, the powder obtained was adjusted by classification to the desired particle size. The particles of 5 μm or less were removed by air classification by using a turbo classifier. Then, the powder was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. After allowing to cool, the powder was taken out to obtain graphite fine powder. The thus obtained graphite powder had an average particle size of 20.5 μm, and a boron content of 0 mass %.

<B-3>: Vapor-Phase Grown Carbon Fiber
The vapor-phase grown carbon fiber (VGCF™) was VGCF-G (fiber diameter 0.1-0.3 μm, fiber length 10-50 μm), mfd. by Showa Denko K.K.

<B-4>: Carbon Nanotube
The carbon nanotube (hereinafter, referred to as "CNT") was obtained in the following manner.

A hole having a diameter of 3 mm, and a depth of 30 mm was bored in a graphite rod having a diameter of 6 mm and a length of 50 mm from the tip thereof along the center axis, and the hole was packed with a mixture powder of rhodium (Rh): platinum (Pt): graphite (C)=1:1:1 (mass ratio), to thereby form an anode. On the other hand, there was formed a cathode having a diameter of 13 mm and a length of 30 mm which comprised graphite having a purity of 99.98 mass %.

These electrodes were disposed in a reaction container so that they were disposed opposite to each other, and the electrodes were connected to a direct current power supply. The inside of the reaction container was replaced with helium gas having a purity of 99.9 vol. %, and direct current arc discharge was conducted. Thereafter, the soot which had been attached to the inner wall of the reaction container (chamber soot), and the soot which had been accumulated on the cathode (cathode soot) were collected. The pressure in the reaction container and the electric current were 600 Torr and 70 A, respectively. During the reaction, the anode and the cathode were operated so that the gap between the anode and the cathode always became 1-2 mm.

The thus collected soot was charged into a mixture solvent comprising water and ethanol (mixing mass ratio=1:1), and then was dispersed therein using ultrasound, and the resultant dispersion was collected and the solvent was removed by using a rotary evaporator. The thus obtained sample was dispersed in a 0.1%-aqueous solution of benzalkonium chloride as a cationic surfactant by using supersonic waves, and then was subjected to centrifugal separation at 5000 rpm for 30 min., and the resultant dispersion was collected. Further, the dispersion was purified by heat-treating the dispersion in air at 350° C. for five hours, to thereby obtain carbon nanotube having a fiber diameter of 1-10 nm and a fiber length of 0.05-5 μm.

<Component (C)>: Reactive Monomer

<C-1>

Divinylbenzene: DVB-960, mfd. by Nippon Steel Chemistry Co., Ltd. (product corresponding to divinylbenzene content of 95-97%)

<C-2>

Styrene: Reagent chemical, mfd. by Wako Pure Chemical Industries Co., Ltd.

<Curing Initiator>

Dicumyl peroxide: Parkmil-D, mfd. by Nippon Oil & Fats Co., Ltd.

2,5-dimethyl-2,5 di(t-butyl peroxy) hexane-3; Perhexa-25B, mfd. by Nippon Oil & Fats Co., Ltd.

<Thermosetting Resin>

Phenolic resin: Resol Resin BRL-274, mfd. by Showa Highpolymer Co. (viscosity at 20° C.: 25 Pa·s, non-volatile component 75%)

The following Table 1 shows the ingredients (mass ratio) of the curable compositions in the respective Examples and Comparative Examples, with respect to the compositions other than the carbonaceous materials. The following Table 2 shows the ingredients (mass ratio) of the curable compositions in the respective Examples and Comparative Examples, with respect to the curable compositions.

Example 1, Example 10

The raw materials as shown in the above Tables 1 and 2 were kneaded at a temperature of 80° C. for 15 minutes by using a kneader. Each of the resultant kneaded product was charged into a mold for providing a plate of 100 mm×100 mm (having different thicknesses depending on the item to be tested for various properties), and was heated at 170° C. (mold) for 12 minutes under applied pressure of 30 MPa by using a 50t-compression molding machine to obtain a cured product.

Examples 2-9, Examples 11-12, Comparative Example 1

The raw materials as shown in the above Tables 1 and 2 were kneaded at a temperature of 80° C. for 15 minutes by using a kneader. Each of the resultant kneaded product was charged into a mold for providing a plate of 100 mm×100 mm (having different thicknesses depending on the item to be tested for various properties), and was heated at 180° C. (mold) for 7 minutes under applied pressure of 30 MPa by using a 50t-compression molding machine to obtain a cured product.

Comparative Example 2

The raw materials as shown in the above Tables 1 and 2 were kneaded at a temperature of 80° C. for 15 minutes by using a kneader. Each of the resultant kneaded product was charged into a mold for providing a plate of 100 mm×100 mm (having different thicknesses depending on the item to be tested for various properties), and was heated at 180° C. (mold) for 5 minutes under applied pressure of 30 MPa by using a 50t-compression molding machine to obtain a cured product.

The results of the property measurement with respect to the cured products obtained in the above Examples and Comparative Examples are shown in the following Table 3.

TABLE 1

| | | | | A1 | A2 | A3 | A4 | A5 | A6 | A7 | A8 | A9 |
|---|---|---|---|---|---|---|---|---|---|---|---|---|
| (A) Component | <A-1> | 1,2-polybutadiene | B-3000 | 70 | 55 | 55 | 40 | | | | | 35 |
| | <A-2> | terminal-modified polybutadiene | TE-2000 | | | | 20 | 55 | | | | |
| | <A-3> | 1,2-polybutadiene | RB-810 | 10 | 40 | 40 | 40 | 40 | | | 40 | 40 |
| | <A-4> | partially hydrogenated 1,2-polybutadiene (26.8%) | | | | | | | | 100 | 55 | |
| | <A-5> | partially hydrogenated 1,2-polybutadiene (50.8%) | | | | | | | | | | 20 |
| (C) Component | <C-1> | divinyl benzene | | | | 5 | 5 | | 5 | | 5 | 5 |
| | <C-2> | styrene | | | 20 | | | | | | | |
| thermosetting resin | | Phenolic resin | BRL-274 | | | | | | 100 | | | |
| curing initiator | | dicumyl peroxide | Percumyl D | 4 | 4 | | 4 | 4 | | 4 | 4 | 4 |
| | | 2,5-dimethyl-2,5-di(t-butyl peroxy)hexane | Perhexa 25B | | | 5 | | | | | | |

TABLE 2

Ingredients of curable composition (mass ratio)

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|
| Ingredients other than carbonaceous material | A1 | 17.2 | | | | | | | | | | | | | |
| | A2 | | 17.2 | 15.9 | 14.8 | 17.2 | 17.2 | | | | | | | 17.2 | |
| | A3 | | | | | | | 14.8 | | | | | | | |
| | A4 | | | | | | | | 14.8 | | | | | | |
| | A5 | | | | | | | | | 14.8 | | | | | |
| | A6 | | | | | | | | | | | | | | 17.2 |
| | A7 | | | | | | | | | | 14.8 | | | | |
| | A8 | | | | | | | | | | | 14.8 | | | |
| | A9 | | | | | | | | | | | | 14.8 | | |
| Carbonaceous material | B1 | 82.8 | 82.8 | 84.1 | 85.2 | 75.7 | 73.6 | 85.2 | 85.2 | 85.2 | 85.2 | 85.2 | 85.2 | | 82.8 |
| | B2 | | | | | | | | | | | | | 82.8 | |
| | B3 | | | | | 7.1 | | | | | | | | | |
| | B4 | | | | | | 9.2 | | | | | | | | |

TABLE 3

Physical properties

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|
| volume resistivity | mΩ·cm | 6.3 | 8.7 | 9.4 | 7.4 | 5.2 | 4.0 | 7.0 | 5.2 | 4.3 | 5.8 | 7.1 | 5.6 | 19.2 | 4.7 |
| bending strength | MPa | 36.6 | 46.8 | 51.0 | 49.8 | 53.2 | 57.9 | 52.2 | 50.1 | 57.5 | 42.4 | 50.6 | 50.4 | 46.7 | 77.8 |
| bending strain | % | 0.63 | 0.74 | 0.75 | 0.75 | 0.62 | 0.54 | 0.65 | 0.64 | 0.55 | 0.82 | 0.79 | 0.78 | 0.74 | 0.32 |
| Tg | °C. | 190 | 209 | 211 | 211 | 215 | 220 | 216 | 218 | 220 | 196 | 206 | 205 | 209 | 190 |
| mass change rate in hydrothermal resistance test | % | −0.35 | −0.11 | −0.09 | −0.08 | −0.08 | −0.07 | −0.08 | −0.11 | −0.16 | −0.17 | −0.11 | −0.10 | −0.09 | 1.80 |
| moldability (disk flow test) | mm | 118 | 120 | 110 | 110 | 108 | 105 | 105 | 112 | 100 | 122 | 116 | 114 | 117 | 94 |

The volume resistivity was measured by the four-probe method in accordance with JIS K 7194.

The bending strength and bending strain were measured by using Autograph (AG-10kNI), mfd. by Shimadzu Corporation. In accordance with JIS K 6911, a test piece (80 mm×10 mm×4 mm) was subject to the measurement in the three-point bending strength method under the conditions of a span interval of 64 mm, and a bending rate of 2 mm/min.

The Tg was measured by the TMA method using Thermoanalyzer (TMA-50), mfd. by Shimadzu Corporation. The size of the test piece was 3×3×5 (mm). In this measurement, in an atmosphere of nitrogen supply of 50 mL/min., the coefficient of linear expansion is measured from 30° C. to 250° C. at a temperature increasing rate of 5° C./min., to thereby determine the Tg In the hydrothermal resistance measurement, in accordance with JIS K 7209, a test piece having a size of 30 mm×30 mm×3 mm was placed in a fluorine-containing resin container, and 50 ml of distilled water was added thereto. Then, this system was placed in a pressure-resistant SUS 316L-container, and subjected to the measurement for 168 hr while the container was rotated in an oven of 180° C. The mass of the sample before and after the test was measured, to thereby the rate of mass change.

The moldability (Disc flow test) was conducted by charging 10 g of a composition into a press machine adjusted to 160° C. and applying a load of 18 t thereto, to thereby evaluate the spreading (diameter, m) of the material.

As shown in Table 3, the cured products and molded products which had been obtained by using the curable composition according to the present invention were excellent in the hydrothermal resistance, thermal resistance, mechanical strength, and electroconductivity and the flowability at the time of the molding thereof was also good.

Example 13

Figure 2:
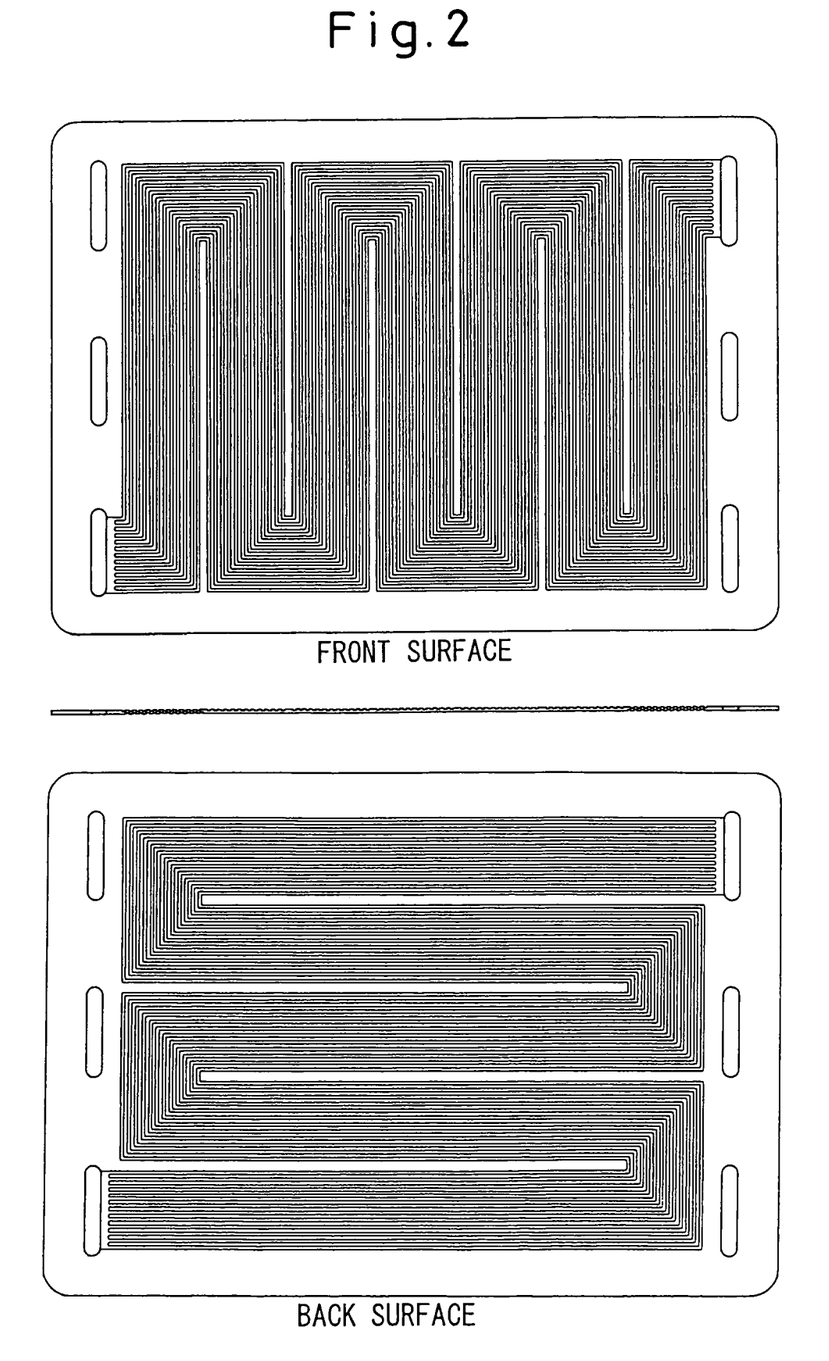
FIG. 2 is schematic plan views showing a surface and a back surface, respectively, of a fuel separator plate which has been obtained in Example 13 appearing hereinafter.
Figure 3:
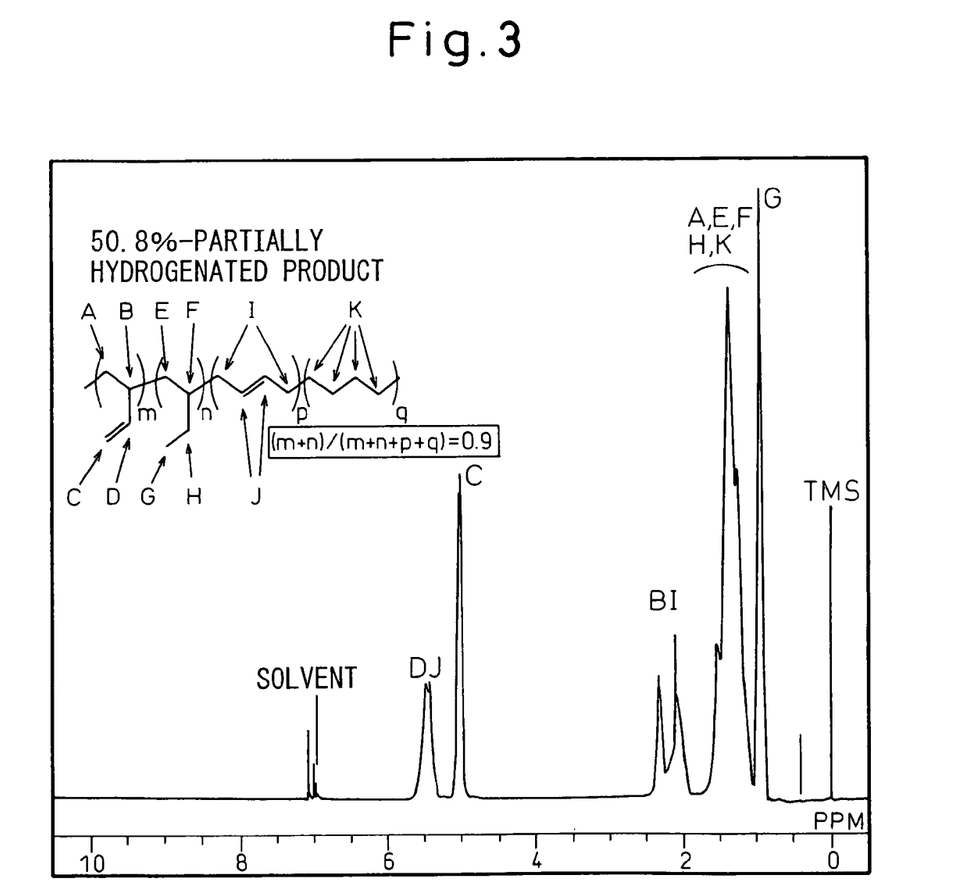
FIG. 3 is a chart showing an $^1$H-NMR spectrum of the 50%-partially hydrogenated 1,2-polybutadiene which has been obtained in <A-5> appearing hereinafter.

The composition obtained in Example 1 was charged into the mold capable of providing a plate having a size of 280× 200×1.5 mm and having 1 mm-pitch grooves on both sides thereof, and was cured by using a 500t-compression molding machine at a mold temperature of 170° C., under a pressure of 60 MPa for 10 minutes, to thereby obtain a flat plate in the form of a fuel cell separator having grooves on both sides thereof (FIG. 2).

INDUSTRIAL APPLICABILITY

As described hereinabove, the curable resin composition according to the present invention can provide a cured product having excellent properties (such as thermal resistance, hydrothermal resistance, electroconductivity and heat-radiating property), and therefore, the present invention can be widely applied to materials in various fields which have heretofore been difficult to realize. Examples of the usage or application of the present invention may include: various application or parts including fuel cell separators, electronic materials such as electrodes, circuit boards, resistors, laminates for batteries; and various members such as heaters, members constituting heat-generating device, dust-collecting filter elements, panel-type heaters, and electromagnetic materials.

The invention claimed is:

1. A hydrothermally resistant electroconductive cured product which has a Tg of 160° C. or more, a bending strength of 30 MPa or more in accordance with JIS K 6911, and a volume resistivity of $2\times10^{-2}$ Ωcm or less, obtained by curing a curable composition consisting of:
    (A) a hydrocarbon compound having a plurality of carbon-carbon double bonds,
    (B) an electroconductive carbonaceous material selected from the group consisting of, or a combination of at least two kinds of: natural graphite, artificial graphite, expanded graphite, carbon fiber, vapor-phase grown carbon fiber, and carbon nanotube, and
    (C) at least one curing initiator selected from the group consisting of organic peroxides and azo compounds,
    wherein the hydrocarbon compound (A) having a plurality of carbon-carbon double bonds is a polymer wherein the ratio of a monomer unit having a side-chain containing a carbon-carbon double bond and saturated main chain is 60 mole % or more, based on the total number of monomer units constituting the polymer, and
    wherein the hydrocarbon compound (A) having a plurality of carbon-carbon double bonds is at least one kind selected from the group consisting of 1,2-polybutadiene and 3,4-polyisoprene, and
    wherein the mass ratio of the hydrocarbon compound having a plurality of carbon-carbon double bond as the component (A) and the electroconductive carbonaceous material as the component (B) is 0.01:1 to 1.5:1.

2. A hydrothermally resistant electroconductive cured product according to claim 1, which has a rate of mass change in the range of +1.5% to −1.5%, when a test piece of the cured product having a size of 30 mm×30 mm×3 mm is subjected to a hydrothermal resistance test at 180° C., for 168 hours.

3. The hydrothermally resistant electroconductive cured product according to claim 1 in the form of a hydrothermally resistant molded product wherein at least one flow channel for a gas is formed on one side or both sides thereof.

4. A process for producing the hydrothermally resistant molded product according to claim 3, wherein the molded product is produced by compression molding, transfer molding, injection molding or injection compression molding.

5. The hydrothermally resistant electroconductive cured product according to claim 1, wherein the carbonaceous material (B) has a power electric resistivity in the right angle direction that is 0.1 Ωcm or less with respect to the applied pressure direction in a state where the carbonaceous material is pressed so as to provide a bulk density of the carbonaceous material of 1 g/cm$^3$.

6. The hydrothermally resistant electroconductive cured product according to claim 1, wherein the carbonaceous material (B) contains 0.05 mass % to 10 mass % of boron.

7. A fuel cell separator formed from the hydrothermally resistant electroconductive cured product according to claim 1, wherein at least one flow channel for a gas is formed on one side or both sides thereof.

8. A process for producing the fuel cell separator according to claim 7, wherein the fuel cell separator is produced by compression molding, transfer molding, injection molding or injection compression molding.

9. The fuel cell separator according to claim 7, which has a rate of mass change in the range of +1.5% to −1.5%, when a test piece of the fuel cell separator having a size of 30 mm ×30 mm ×3 mm is subjected to a hydrothermal resistance test at 180° C., for 168 hours.

10. The fuel cell separator according to claim 7, wherein the electroconductive carbonaceous material (B) contains 0.05 mass % to 10 mass % of boron.

* * * * *